Feb. 14, 1950     S. SHAKIN     2,497,694
TANK GAUGE
Filed Sept. 14, 1948     2 Sheets-Sheet 1
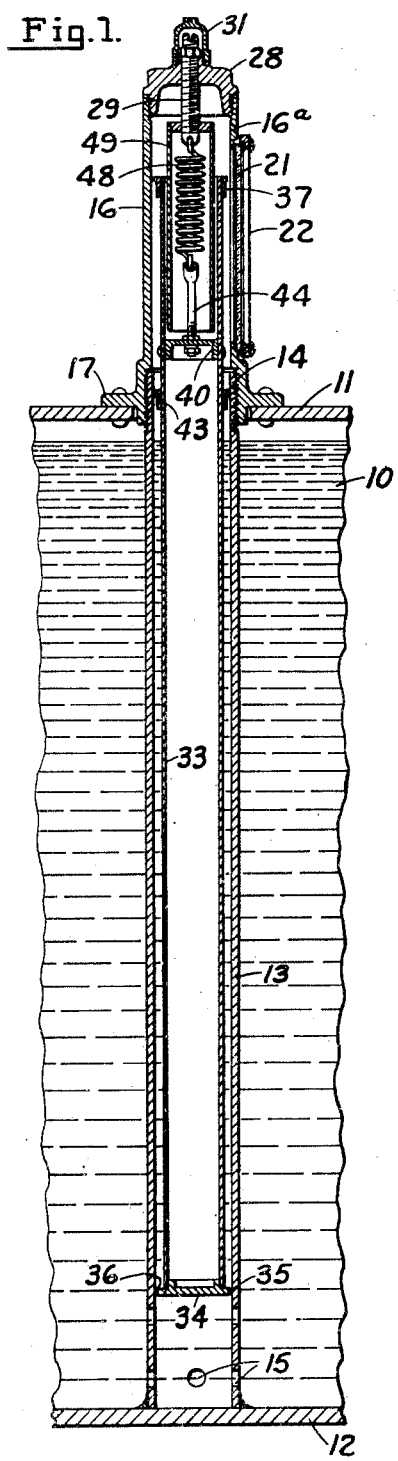
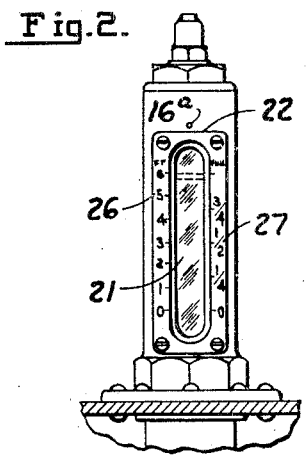
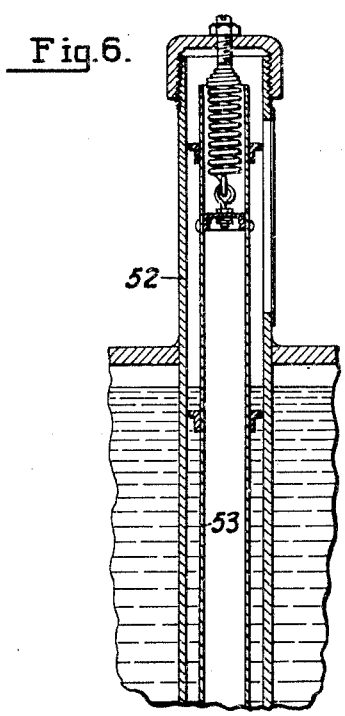
INVENTOR.
SAMUEL SHAKIN
BY
Walter E. Wollheim
ATTORNEY.

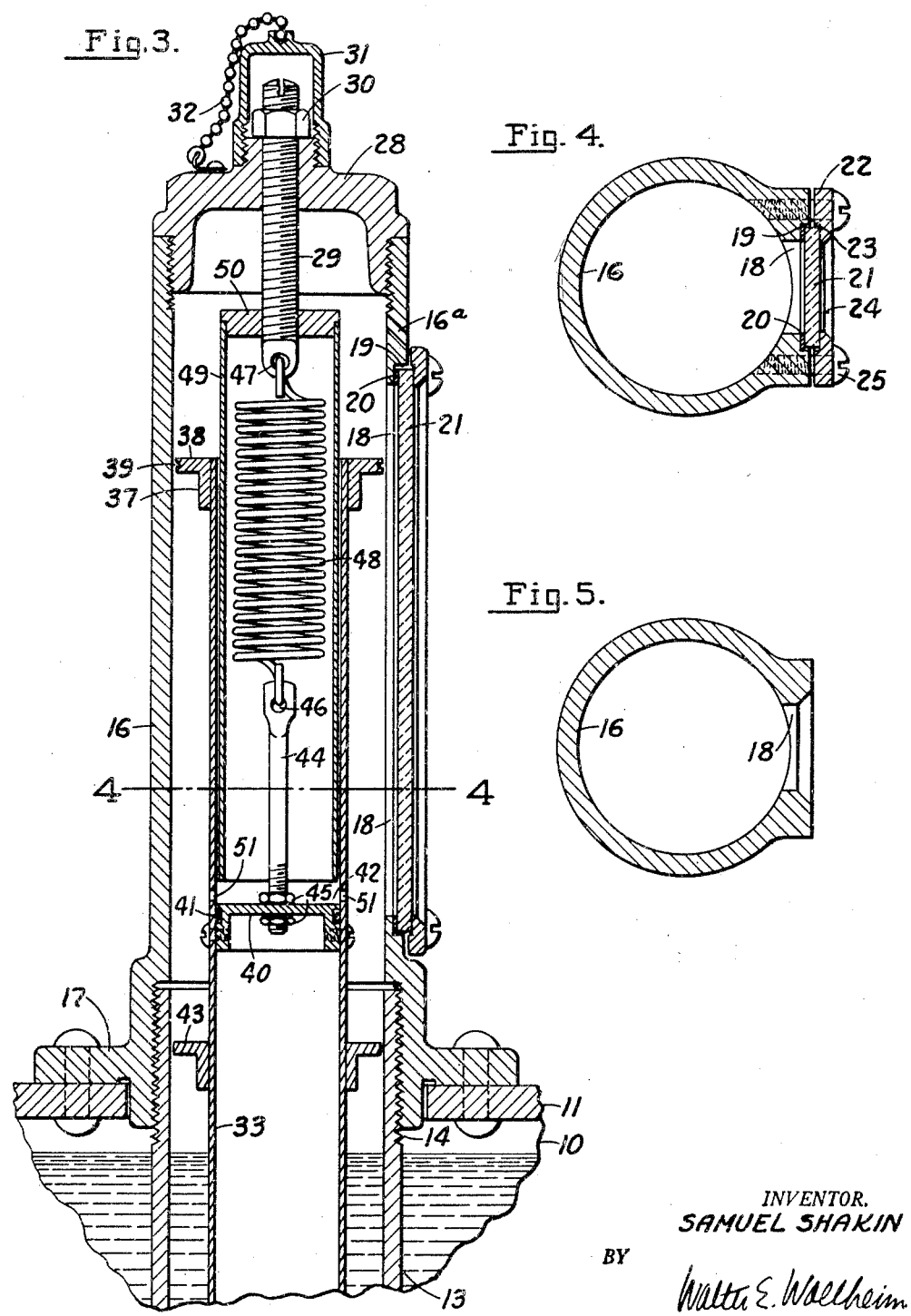

Patented Feb. 14, 1950

2,497,694

UNITED STATES PATENT OFFICE 2,497,694

TANK GAUGE

Samuel Shakin, Newark, N. J., assignor to Nathan Manufacturing Company, New York, N. Y., a corporation of New York Application September 14, 1948, Serial No. 49,235

10 Claims. (Cl. 73—322)

This invention relates to liquid level gauges and particularly to the kind for determining the height of water in locomotive tenders, and refers especially to the type of gauge which accurately indicates the height of the water with a relatively slight movement of the indicating member of the gauge.

It is the principal object of the invention to provide in such a gauge indicating means of a kind that can easily be observed by the engine crew in the cab.

Another object is to provide a gauge which can be adjusted to the size of the tender or tank to which it is applied when installing the gauge, so that one size of gauge indicating mechanism can be used for differently sized tanks.

A further object is to eliminate in a gauge of this kind rapid fluctuations of the indicating member due to the surging of the water in the tank.

A still further object is to provide a gauge of this type which has a minimum number of parts, is easily assembled and applied to tanks, and requires no maintenance expenditures.

Other objects will become apparent in the following specification and accompanying drawings in which preferred forms of a gauge embodying the aforesaid improvements are described, respectively illustrated.

In the drawings,

Fig. 1 shows a fragmentary sectional view of a tank with the gauge mounted thereon;

Fig. 2 is a front elevational fragmentary view of an indicator head of the gauge;

Fig. 3 is an enlarged sectional view through the upper part of the gauge and tank corresponding to Fig. 1;

Fig. 4 is an horizontal sectional view through the indicator head only along the plane of line 4—4 in Fig. 3;

Fig. 5 is an horizontal sectional view similar to Fig. 4 but embodying a slight modification of the head; and Fig. 6 is a fragmentary sectional view similar to Fig. 1, of a modified construction of the gauge.

Like characters of reference denote similar parts throughout the several views.

10 is a tank having a top wall 11 and a bottom wall 12. 13 is a pipe, preferably welded to the bottom wall 12, threaded at its top at 14 and projecting slightly above the top wall 11 of the tank. The bottom of the pipe 13 is provided with perforations 15 or the like affording communication between the tank and the bottom of the pipe.

16 is a substantially cylindrical head, having a flange 17 at its bottom for preferably riveting the head to the top wall of the tank 10. An inner central portion is screwed onto the threaded top part 14 of pipe 13 before the head is fastened to the tank. At the front of the head, as shown in Figs. 2 and 4 is a longitudinal slot 18, having a recess 19, into which is fitted a gasket 20 and a glass 21, held against the head by a cover plate 22, recessed at 23 for the glass and having a slot 24 corresponding to slot 18. Screws 25 hold the plate and glass against the head. Alongside slot 24 are graduations 26 and 27 indicative of the contents of the tank in feet and volume, respectively. The top of the head 16 is closed by a cap 28, having a central adjusting screw 29, a lock nut 30 at its top, and a cover 31 over the end of the screw and lock nut fastened to the head by a suitable chain 32.

33 is a tubular member within the pipe 13 and in spaced relation therewith. The bottom of the member is closed by a cap 34 which has a flange 35 extending therefrom only slightly smaller in diameter than the inside diameter of the pipe 13 defining a restricted passage 36. The top end of the member 33 is open and has at its edge a collar 37 having a flange 38 extending therefrom which is provided with a groove 39 either painted or filled with a luminescent material. The tubular member 33 is closed at its upper part by a fluid tight partition 40 provided with a packing ring 41 and secured to the member somewhat below its top edge, so that a cup 42 is defined from the edge of the member to the partition. The tubular member 33 from its partition 40 to its bottom cap 34 forms a fluid and air tight longitudinal chamber. A spacer 42 of preferably circular shape is provided around the outside of member 33, near the top of pipe 13 to guide the member within the pipe.

A post 44 is adjustably fastened to partition 40 by lock nuts 45 and terminates in an eye 46 at its top. The bottom end of adjusting screw 29 is similarly provided with an eye 47. 48 is an helical spring fastened to eyes 46 and 47 which thus suspends the tubular member from the adjusting screw 29. 49 is a tubular shield for the spring 48 fastened to the adjusting screw by a top plate 50. The shield extends into the cup 42 at the top of the member 33. 51 are drain or vent openings at the bottom of the cup 42 immediately above the partition 40.

The operation of the gauge is as follows:

The gauge is installed in a tender or water tank of a locomotive, for instance, by welding or otherwise fastening the pipe 13 to its bottom, as shown in Fig. 1. The head 16 is then fastened to the top of the tank by screwing it onto the threaded top of the pipe 13 and riveting the flange to the top wall 11 of the tank 10. The tubular member assembly 33 with spring 48, shield 49, and cap 28 is then inserted and cap 28 screwed down tightly. The spring must then be adjusted so that the bottom of the member 33 suspended by it will be just off the bottom of the tank. In this position with proper adjustment the collar flange 38 will be in line with the designation 0 on the indicating scales 26 and 27. At that time with the tank empty the weight of the tubular member 33 will be accurately counterbalanced by the adjusted tension of the spring 48. On filling the tank with water, the tubular member 33 will become immerged as the level of the liquid ascends, and the effective pull of the weight of the member on the spring 48 will gradually diminish owing to the buoyancy of the liquid, and consequently the spring will contract, being relieved to a greater extent of the force exerted by the weight of the tubular member 33, and permit the top of the member to rise and so indicate by its collar flange 38 the height of the liquid in the tank. The position of the gauge when the tank is practically full is shown in Fig. 1. As water is withdrawn, the action of the gauge will be exactly the reverse to that just described, the effective pull of the weight of the member 33 gradually increasing and thus lowering its top end with the collar flange 38 and thereby indicate the proper height of the water in the tank until the tubular member reaches its lowest position when the weight of the member is counterbalanced by the spring and the collar flange 38 again indicates 0 contents in the tank. It is thus evident that the relatively large variations of water in the tank measurable in feet are accurately reflected in the gauge by a travel of only a few inches exactly proportional to the variations of water level in the tank.

In locomotives where, due to the swaying of the locomotive during its travel, a surging action of the water takes place, the restricted passage 36 around the flange of the bottom cap 34 of the member serves as a baffle and, by slowing down the passage of water around the member, steadies its motion and prevents erratic movement of the gauge. The cap 34, as well as spacer 43 around the upper part of member 33 also serve to keep the member in central alignment with the pipe 13 and insure efficient functioning of the device. The luminescent filling in the groove 39 of the collar flange 38 provides clear reading of the gauge especially at night and without the use of flash lights. The glass 21 in the indicator head excludes dirt and protects the working parts of the gauge. The top of the indicator head is provided with a vent hole 16a to provide for easy operation, and drain holes in the cup 42 immediately above the partition 40 of the tubular member 33 permit water to drain off the cup, should water find its way into it, because of broken glass or other causes which otherwise might affect the reading of the gauge owing to the increased weight of the member.

Numerous modifications can be made in the construction of the gauge. Where the gauge is not subject to dust, as for instance in applications other than to locomotives, the glass can be omitted, as illustrated in Fig. 5. In Fig. 6, the indicator head 16 and pipe 13 are combined in one pipe 52, while the tubular member 33 and shield 49 are made of one member 53, the operation of the gauge being the same as the one described before. In place of a tubular member 33, any other means of suitable weight may be used, as for instance a solid rod.

Various other changes in the form, proportion and minor details of construction may be resorted to without departing from the principle or sacrificing any of the advantages of the invention as defined in the appended claims.

What I claim as new, is:

1. In a gauge for observing the level of a liquid in a tank, an indicator head above the tank having a relatively short slot, a relatively long pipe forming an extension from the head to the bottom of the tank having means of communication with the tank at its lower end, a weighted member within the pipe and extending into the head, a relatively short spring having one end adjustably secured to the top of the head and its other end near the top of the weighted member suspending and counterbalancing the member, whereby variations in the level of the liquid will be observable through the slot by the minimized, but proportionate, travel of the top of the member.

2. In a gauge according to claim 1, baffle plates around the weighted member guiding the member within the pipe and preventing surging of the liquid to cause sudden variations in the position of the member.

3. In a gauge according to claim 1, a collar at the top of the member, and a luminescent mark on the collar to facilitate the observance of the top of the member through the slot in the indicator head.

4. In a gauge for observing the level of a liquid in a tank, an indicator head above the tank having a relatively short slot, a relatively long pipe forming an extension from the head to the bottom of the tank having means of communication with the tank at its lower end, a weighted member within the pipe and extending into the head, a spring adjustably secured to the head suspending and counterbalancing the weighted member, whereby variations in the level of the liquid will be observable through the slot by the minimized, but proportionate, travel of the top of the member, the weighted member comprising a tube closed at its bottom, and a fluid tight partition below its top forming a cup from its top to the partition, the cup having drainports immediately above the partition.

5. In a gauge according to claim 4, and a shield around the spring telescoping into the cup.

6. In a gauge according to claim 1, baffle plates around the weighted member guiding the member within the pipe and preventing surging of the liquid to cause sudden variations in the position of the member, a collar at the top of the member, and a luminescent mark on the collar to facilitate the observance of the top of the member through the slot in the indicator head.

7. In a gauge according to claim 4, a bolt in the top of the indicator head for adjustably securing the spring to the head, and a shield around the spring fastened to the bolt and telescoping into the cup.

8. In a gauge according to claim 4, baffle plates around the tube guiding the tube within the pipe and preventing surging of the liquid to cause sudden variations in the position of the tube, a collar at the top of the tube, and a luminescent mark on the collar to facilitate the observance of the top of the tube through the slot in the indicator head.

9. In a gauge for observing the level of a liquid in a tank, a relatively long pipe through the tank and extending above it, the pipe being fastened to the top of the tank and to its bottom and having means of communication with the tank at its lower end, the portion of the pipe extending above the tank being closed at its top and having a relatively short slot, a weighted member, having a cup like cavity in its top, within the pipe and extending into the portion of the pipe above the tank, a relatively short spring having one end adjustably secured to the closed top of the pipe and its other end to the bottom of the cup like cavity suspending and counterbalancing the weighted member, whereby variations in the level of the liquid will be observable through the slot by the minimized, but proportionate, travel of the top of the member.

10. In a gauge according to claim 9, the weighted member being of tubular shape and the cup like cavity at its top forming a shield for the spring.

SAMUEL SHAKIN.

REFERENCES CITED

The following references are of record in the file of this patent:

UNITED STATES PATENTS

| Number | Name | Date |
| --- | --- | --- |
| 1,193,744 | Wilkinson | Aug. 8, 1916 |
| 1,306,557 | Newton | June 10, 1919 |
| 2,315,238 | Yarnall | Mar. 30, 1943 |

FOREIGN PATENTS

| Number | Country | Date |
| --- | --- | --- |
| 533,737 | France | Mar. 9, 1922 |